United States Patent [19]
Jurca

[11] Patent Number: 5,272,312
[45] Date of Patent: Dec. 21, 1993

[54] PROCESS FOR QUALITY CONTROL OF LASER BEAM WELDING AND CUTTING

[76] Inventor: Marius-Christian Jurca, P.O. Box 1364, D-6054 Rodgau 1, Fed. Rep. of Germany

[21] Appl. No.: 623,379
[22] PCT Filed: Mar. 14, 1990
[86] PCT No.: PCT/EP90/00412
  § 371 Date: Aug. 8, 1991
  § 102(e) Date: Aug. 8, 1991
[87] PCT Pub. No.: WO90/10520
  PCT Pub. Date: Sep. 20, 1990

[30] Foreign Application Priority Data

Mar. 14, 1989 [DE] Fed. Rep. of Germany ....... 3908187

[51] Int. Cl.$^5$ ............................................... B23K 26/02
[52] U.S. Cl. ......................... 219/121.83; 219/121.63; 219/121.67
[58] Field of Search .................. 219/121.83, 121.63, 219/121.64, 121.67, 121.72; 364/474.08

[56] References Cited
U.S. PATENT DOCUMENTS

| | | | |
|---|---|---|---|
| 4,939,336 | 7/1990 | Meyer et al. | 219/121.62 |
| 5,059,761 | 10/1991 | Koegl et al. | 219/121.83 |
| 5,067,086 | 11/1991 | Yamazaki et al. | 364/474.08 |
| 5,155,329 | 10/1992 | Terada et al. | 219/121.83 |
| 5,164,565 | 11/1992 | Addiego et al. | 219/121.68 |

*Primary Examiner*—C. L. Albritton
*Attorney, Agent, or Firm*—Oldham, Oldham & Wilson Co.

[57] ABSTRACT

Method for on-line quality assurance when processing materials with laser energy by means of electro-optical detection of the near-infrared radiation of the material which is thrown out of the "key-hole" during the material processing operation with laser, thus detecting the dimension of hollows (pores, holes) which have arisen in the workpiece. The detection of the thermal radiation of the thrown out material is effected in a wavelength of 800 nm up to approximately 1300 nm, preferably with simultaneous detection of the ultraviolet radiation of the plasma could in a preferred wavelength of approx. 200 nm up to 450 nm. Finally, there is also a description of the processing procedure for near-infrared signals.

6 Claims, 6 Drawing Sheets

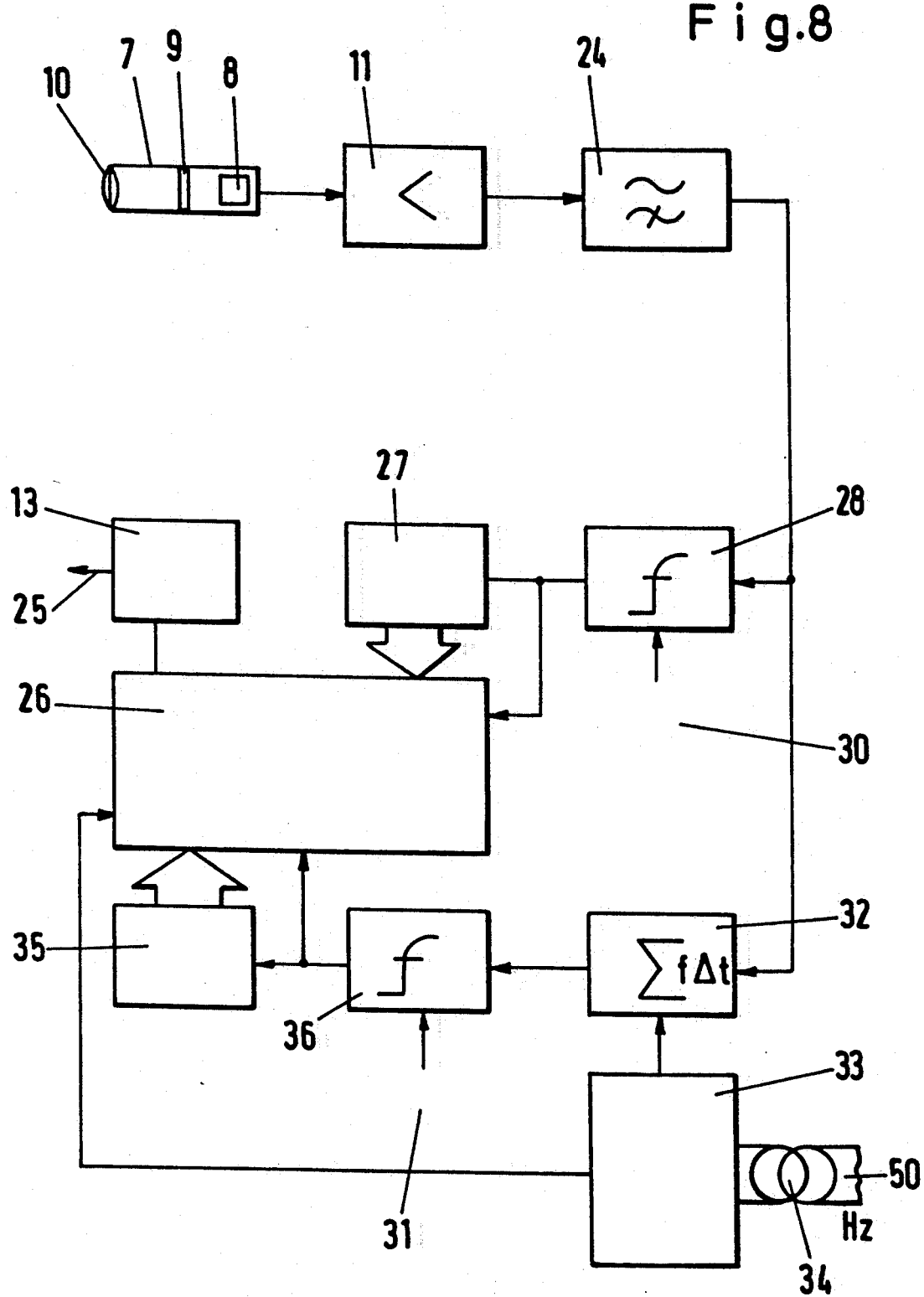

PROCESS FOR QUALITY CONTROL OF LASER BEAM WELDING AND CUTTING

BACKGROUND OF THE INVENTION

The invention concerns a method for quality assurance when processing materials with laser energy, and preferably laser beam welding or cutting. In such processing, the ultraviolet light arising in the plasma cloud during the material processing operation is detected by a detector in a wavelength of approx. 200 nm up to approx. 450 nm to control the laser beam coupling in the workpiece as well as the check for specified limits of other process parameters such as laser output power, beam defocussing, beam quality, feeding of shielding gas and working gas as well as workpiece structure, cleaning status of the workpiece surface, and welding gap width. Such a quality assurance method is known from DVS-report No. 113 on the conference "ECLAT '88", p. 58-59. Known devices use a light sensitive detector consisting of a silicon photodiode, which has an enhanced UV-light sensitivity, and an optical filter, which is transparent only for the particular UV-light wavelengths. The filter is located between the welding pool (4) and the detector. The received UV-signal is turned into an electric signal by the detector, and is fed to a processing unit. With such a device, it is possible during a laser material processing, to detect changes of the various parameters and identify them as possible material processing faults.

This known device has the disadvantage, in that it is not possible to detect and indicate a processing fault during a laser welding process, when two or more parameters with contrary effects on the welding plasma have changed at the same time. Furthermore, if a high detection sensitivity is adjusted, such a device indicates too many faults, being in fact the result of a laser welding process parameter disturbance but not the result of welding failures.

As background of this invention also the use of a photodiode for monitoring a laser drilling process was considered. This well known monitoring method is shown in: JP-DS "Pat. abstr. of Japan", 1987, Vol. 11/No. 166, M-593, Kokai No.: 61-296980.

SUMMARY OF THE INVENTION

The object of the present invention is therefore to provide a device and method wherein quality control of the well, being produced by laser energy, is effected during the welding process itself, independent of changes of one or several processing parameters which may cause a welding fault.

In this invention, the apparatus has the advantage, that the quantity of the liquid material which is thrown out of the welding pool (4) due to the energy feed and consequently due to the vapor pressure in the "keyhole", is electro-optically detected at a predetermined wavelength of 800 nm up to preferably 1300 nm by at least one photodiode and transformed into an electrical signal which is led to a processing unit. The apparatus and method allows the user to determine the dimension of the hollows having arisen in the workpiece. The welding faults can be detected and can be identified as processing faults with the aid of the processing unit as defined herein.

A fundamental advantage of the method is found in the fact that unambiguous monitoring of real welding faults is possible. This is based on the fact that the dimension of the drops which are thrown out of the welding pool is equivalent to the dimension of the pores and hollows being let in the weld. The apparatus of the invention has the advantage that the method according to the invention can practically be used. With this apparatus, even deep-seated pores arising in the weld during a laser welding process can be detected without destruction. This shows an additional advantage of the apparatus due to the detection of the workpiece position relative to the laser processing head during the laser operating process, the position of the detected welding faults in the workpiece can reliably be found after the operation for further analyzing purposes or for a workpiece post processing.

The position detection can be realized e.g. for a rotary-symmetrical workpiece with an incremental or absolute rotary angle encoder whose rotary spindle is coupled to the workpiece in the rotary angle during the operation. Further advantages of the apparatus or method are found in the fact that besides holes also pores are detected and identified during the laser welding operation as preferred operation process. So it is possible that even gas-tight welds can be produced. Due to this fact and in combination with the fault position detection on the workpiece the production of welds with laser beam can be made more profitable, because it can be effected without supervision personnel also during night shifts. The welding process can entirely be documented. The assurance of the produced quality leads to a higher degree of automation, to a quicker and faultless material flow, i.e. to a clearly increased productivity of a laser welding unit.

According to today's status of technology the detection of deep-seated pores in a weld is only possible after the welding operation with the aid of very expensive X-ray cameras or with an ultrasonic microscope. The method of the present invention increases furthermore the efficiency of laser material processing preferably when welding or cutting with laser by means of preventing the waste of material and time necessary for a quality test after production. The dimension of the thrown out "spatters" equals the integral of the signal being detected by the invented detector for a defined period of time.

The invention also makes it possible to determine the stability of a weld and/or the largeness of a workpiece damage due to just a single "spatter eruption". As will hereinafter be more fully described, the synchronization of the signal processing with the supply frequency has the advantage that signal disturbances being dependent on the supply frequency are suppressed. Due to this fact the signal processing unit will work correctly without adjusting it, even when the frequency of electrical AC current used in the apparatus is changed between 50 Hz and 60 Hz.

An additional advantage of the apparatus is to provide a near-IR-sensitive device and the possibility of its belated integration into an already existing UV-signal monitoring unit. The apparatus according to the invention is characterized by easy handling as only one detector head has to be mounted and adjusted. The apparatus even works without a focusing lens to offer an additional advantage in the handling of the device, as in this case an exact adjustment of the detector head is not necessary—an approximate alignment of the detector head is sufficient. In addition, the UV-signal can also be detected and the apparatus and method offers the possibility of an exact on-line statement concerning the quality of a laser produced weld, because the additional UV-information helps to a correct interpretation of the detected near-IR signal. The UV-light will arise as soon as sufficient laser energy has been injected into the workpiece, so this gives the possibility of non-contact and laser system independent detection at the beginning and the end of a welding process. The procedure can also be applied for cutting with laser beam with the difference that during the cutting process, the space above as well as below the operating spot is monitored according to the method.

The apparatus is advantageous for monitoring the laser piercing process with the aid of upper detectors, while a laser cutting process mainly is monitored with the aid of lower detectors. The described advantages are applicable with laser processing units which work preferably with $CO_2$ lasers, but also with pulsed solid-state power lasers. Further advantages are shown in the following description of preferred embodiments. The diagrams of the figures can versatilely be combined, and the invention is therefore only to be limited as defined in the appended claims.

BRIEF DESCRIPTION OF THE DRAWINGS

In the following invention is described with examples of application shown in the figures, wherein:

FIG. 8 is a schematic drawing of a preferred configuration of the signal processing unit according to claim 6.

DETAILED DESCRIPTION OF THE INVENTION

A rough examination of possible welding faults results in a classification into two groups:

1. Welding faults being caused during the laser processing operation by exceeded evaporation rates of the material in process or by impurities (in this case holes and pores arise).

2. Welding faults just like gaps which arise in a weld produced with laser energy after the process during the cooling of the material. The present invention enables a reliable on-line detection of welding faults.

Figure 1:
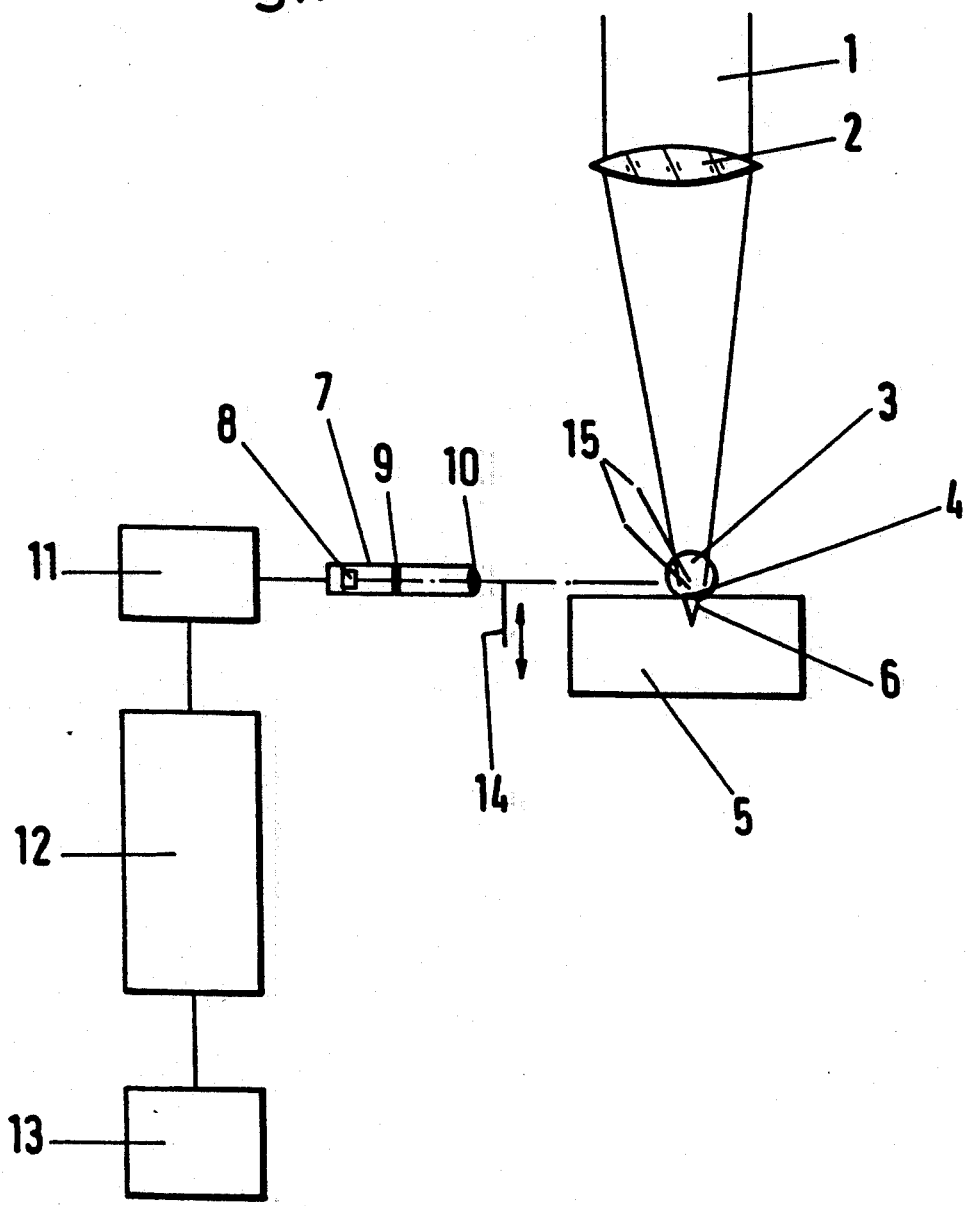
FIG. 1 is a schematic drawing of the arrangement for quality assurance according to the invented method in a preferred configuration when welding metals with laser beam.
Figure 2:
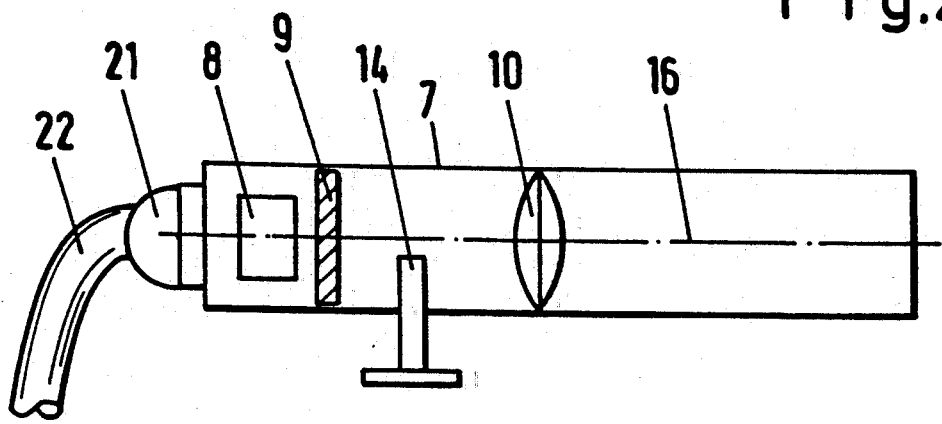
FIG. 2 is a schematic drawing of a preferred design of the apparatus in accordance with the invention.
Figure 3:
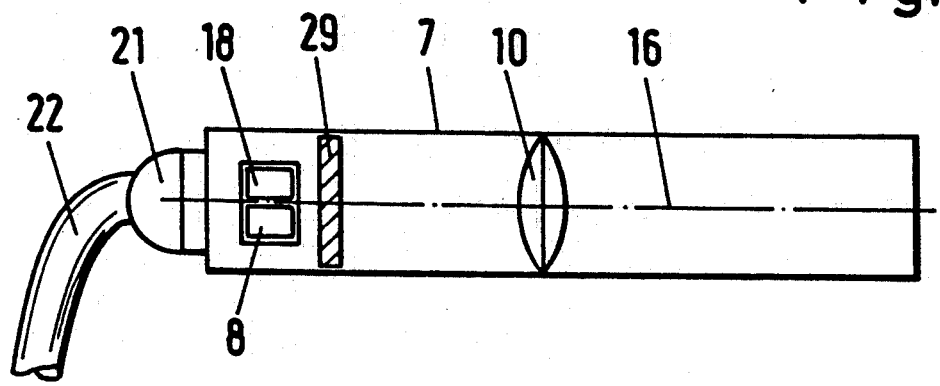
FIG. 3 is a schematic drawing of an alternate embodiment of an apparatus in accordance with the invention.

Turning to FIG. 1, during the energy feed into the workpiece 5 by concentrating the laser beam 1 preferably through a focusing lens 2 on the welding pool 4 a "key-hole" 6 forms in the inner part of the workpiece, from which liquid material in the form of "metal spatters" 15 is thrown out sporadically and a plasma cloud 3 arises above the "key-hole" 6. The welding processing spot 4 is projected on a photodetector 8 through a focusing lens 10 and an optical band-pass filter 9 preferably of colored glass filter type UG 11. The optical components are mounted into a cylindrical housing 7 being equipped with a "lens shade" in welding process direction which protects the detector from ambient light. The aperture 14 is formed as a setting screw, which has been mounted eccentrically into the detector head (compare FIGS. 1 and 2). The signal of the photodiode 8 is transformed with a preamplifier 11 to a level which enables a signal processing with a processing unit 12. A welding fault being detected in the processing unit can be used for further control purposes via an interface circuit 13 (preferably for sorting out bad welded parts). The optical axis 16 of the detector head is directed to the space right above the operating spot 4. With the aid of the shiftable aperture 14, the optical signal to detector 8 can be controlled so that the welding pool 4 is projected on the IR-sensitive detector 8. Details of the detector head according to claim 1 and/or 2 are shown in FIG. 2. Such a device consists of a light-sensitive detector 8, preferably a silicon photodiode and an optical filter 9 being exclusively transparent for predetermined near-IR-light wavelengths. The filter 9 is located between the welding pool 4 and the detector 8. The detected light signal is converted into an electric signal by the detector 8 and is processed in a processing unit 11+12. The electric connection to the photodiode 8 is made via a connector 21 and a connecting cable 22. The preamplifier 11 is preferably mounted into the detector head housing. FIG. 3 shows a preferred design of an alternate embodiment with the apparatus including a UV-IR combined design.

The photodiode 8 is a silicon photodiode which as a good near-IR-sensitivity as well as a good near-UVensitivity. The filter 29 is a colored glass type UG 3, being transparent for predetermined wavelengths of both IR and UV light.

Figure 4:
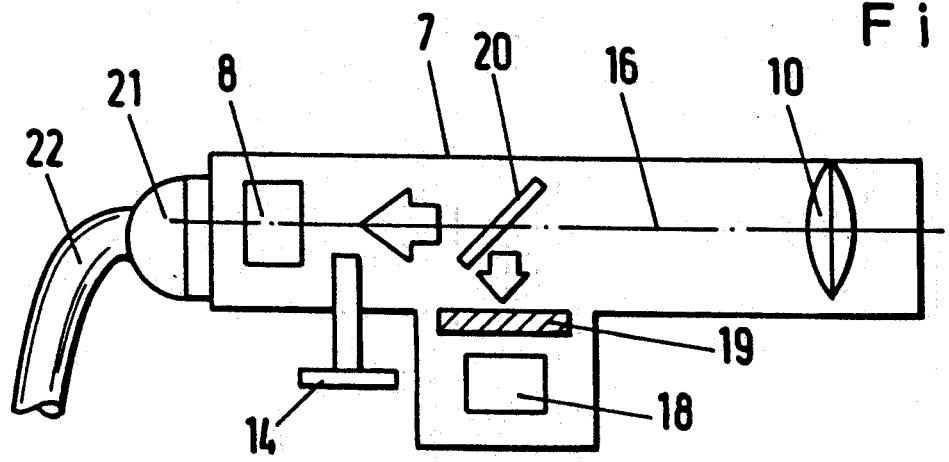
FIG. 4 is a schematic drawing of an alternate embodiment of an apparatus in accordance with the invention.

The device shown in FIG. 4 combines a UV-detector in the apparatus. All advantageous features for each of the embodiments shown in FIGS. 2-3 are combined by the local separation of both of the photodetectors 8 (IR) and 18 (UV), by using a mirror 20 situated at 45° relative to axis 16 and configured to reflect only the UV component of the incident optical signals in a common detector protecting housing with "lens shade" 7, as well as by using a shiftable aperture 14. In this case a colored glass filter in front of the photodetector is not necessary as the mirror 20 and the silicon photodiode 8 provide a band-pass filter behavior.

Figure 5:
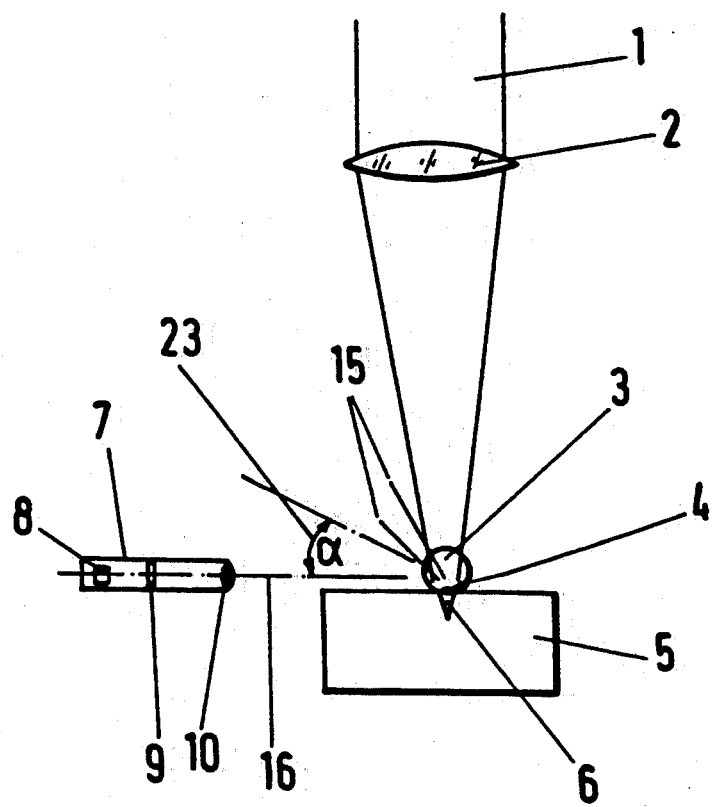
FIG. 5 is a schematic drawing of a preferred welding configuration of the method of the invention.
Figure 6:
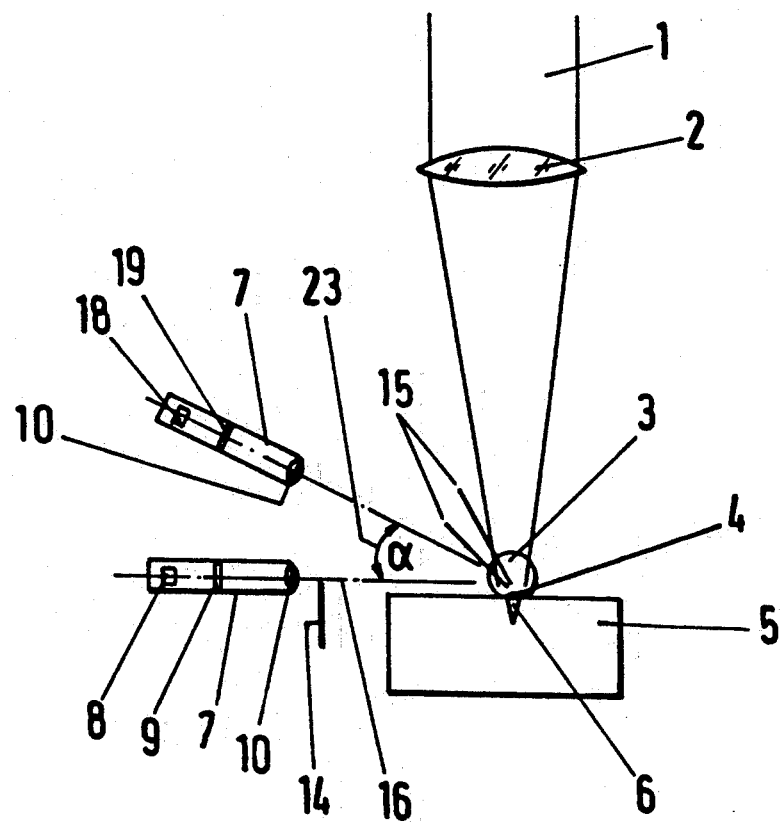
FIG. 6 is a schematic drawing showing an alternate embodiment of a welding configuration of the method of the invention.
Figure 7:
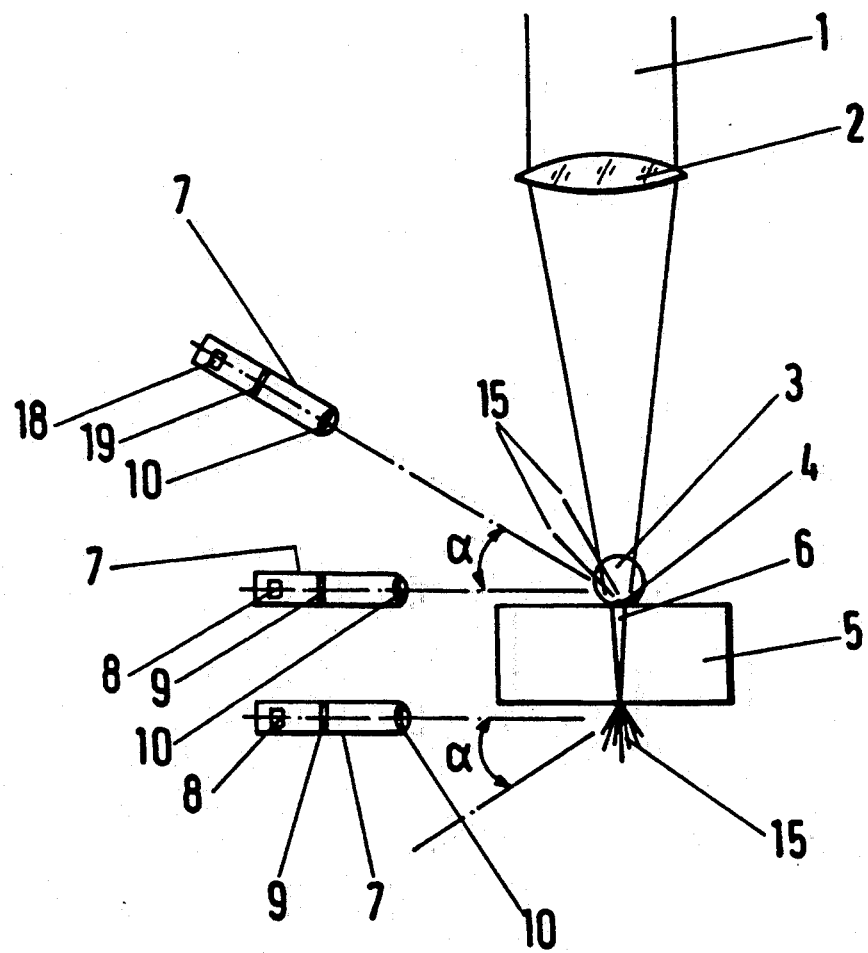
FIG. 7 is a schematic drawing of a preferred cutting configuration of the method according to the invention.

FIG. 5 shows a preferred welding configuration for the application of the apparatus and method of the invention. For detector heads according to FIGS. 2 and 4, the angle 23 of the optical axis of the detector 16 to the horizontal can range between 0° and preferably 30° respectively, and approx. 0° for detector heads according to FIG. 3 (compare FIG. 5). FIG. 6 shows a preferred welding configuration for the application of the apparatus of the invention. The near-IR detector head with the photodiode 8 corresponds as preferred design for the embodiments of FIG. 2 or 4. The UV-detector head is constructed similar to the near-IR detector head, however, it contains different optical components (photodiode 18, colored glass or interference filter 19). FIG. 7 shows a preferred cutting configuration with detector heads corresponding to FIGS. 2-4 used preferably in the same design above and below the laser processing spot (compare FIG. 7). In this configuration the upper detector is used for monitoring the piercing process, and the lower detector for monitoring the cutting process.

The processing of the near-IR signals is effected in a preferred design as shown schematically in FIG. 8. The detector head 7 supplies the signal to a preamplifier 11. The amplified signal passes a high-pass filter 24 for suppressing the level of the ambient light. A first comparator 28 compares the output signal of the high-pass filter 24 with a predetermined threshold 30, which is set for monitoring single strong "eruptions" 15 out of the "key-hole". INSERT The duration of "single eruptions" gives the largeness of the single bigger holes in the weld. The duration of such an "eruption" is measured with clock circuit 27 and the gained information is collected in a failure decision circuit 26 for the purpose of fault decision. The stability of the produced weld is checked by integrating the signal from the high pass filter for IR light 24 in an integrator 32. The integrator is synchronously functioning with the frequency of the AC electrical current via synchronizing circuit 33 and transformer 34. The output signal of the integrator 32 is further processed in a second comparator 28. If the signal exceeds the predetermined threshold 31, this means there has been a loss of stability in the weld. The duration of the failure is measured with a clock circuit 35 (similar to 27) and further processed with the failure decision circuit 26. Then the fault signal reaches the circuit output 25 via the interface circuit 13.

LEGEND 01. laser beam,
02. laser beam focusing device,
03. plasma plume,
04. welding pool or laser material processing spot,
05. workpiece,
06. "key-hole",
07. detector head
08. IR-sensitive photodiode,
09. optical pass filter for 800–1300 nm,
10. lens inside of the detectorhead,
11. preamplifier IR-signal
12. IR-signal processing unit,
13. control interface,
14. shiftable aperture,
15. metal spatter,
16. optical axis of a detectorhead,
17. not used
18. UV-sensitive photodiode,
19. color or interference pass filter for UV light,
20. 45°-violet mirror,
21. detectorhead plug,
22. detectorhead connecting cable,
23. angle of the detectorhead opt. axis to the horizontal,
24. longpass filter for IR-light,
25. output of the signal processing unit,
26. failure decision circuit,
27. stop-watch circuit,
28. comparator,
29. color filter e.g. UG3,
30. threshold for comparator (28),
31. threshold for comparator (36),
32. integrator,
33. mains synchronizing circuit,
34. mains trafo,
35. stop-watch circuit,
36. comparator.

What is claimed is:

1. A method for quality assurance when welding or cutting a workpiece with laser energy in a material processing operation which produces a plasma cloud during material processing operation, comprising the steps of:

detecting ultraviolet light in said plasma cloud operation, by a detector in a wavelength of approx. 200 nm up to approx. 450 nm to generate a first signal which is fed to a processing means and used to control the laser beam coupling in the workpiece monitor predetermined limits of process parameters including laser output power, beam defocussing, beam quality, feeding of shielding gas and working gas as well as workpiece structure, cleaning status of the workpiece surface, and welding gap width, detecting the quantity of liquid material being thrown out of the welding pool produced during the material processing operation when feeding the laser energy to said workpiece by means of a detector which detects thermal radiation in a wavelength of 800 nm up to preferably 1300 nm by at least one photodiode to generate a second signal; and processing said second signal by means of a processing unit to determine the dimensions of the hollows having arisen in the workpiece.

2. An apparatus for laser welding for quality assurance when performing a material processing operation using laser welding comprising at least one photodiode (8) having an optical axis and being sensitive in a wavelength of 800 nm up to 1300 nm, and being mounted into a detector protecting housing (7), said housing having a "lens shade" for protecting the at least one photodiode against disturbing ambient light as well as including a shiftable aperture stop (14) which can be selectively moved vertically into the optic axis (16) to selectively prevent a direct visual contact between said at least one photodiode and the welding pool created during said material processing operation.

3. The apparatus according to claim 2, wherein at least two Si-photodiodes (8, 18) are provided inside the detector housing (7) and an optical filter which allows transmission of predetermined wavelengths of UV and IR light is placed between the photodiodes within detector housing (7) and the welding spot (4).

4. The apparatus according to claim 2, wherein at least two photodiodes are provided within said housing, one of which detects UV light and one of which detects IR light, and using a light reflecting means which acts to reflect only the UV light incident thereon and an optical pass filter (19) which together separate the UV and the near-IR-radiation to be detected by an individual one of said photodiodes.

5. An apparatus for quality assurance when laser cutting and for controlling a laser cutting process or for controlling a laser drilling process comprising a UV-light sensitive detectorhead having at least two near-IR-sensitive photodiodes and a signal processing unit, wherein said detectorhead is disposed such that the projection of UV and IR light produced in the spaces above and below a workpiece adjacent to the laser processed "key-hole" (6) formed around the optical laser beam axis (1) onto said at least two photodiodes.

6. The apparatus according to claim 5, wherein said signal processing unit performs integration of the signals of the at least two near-IR-sensitive photodiodes in a period of time equal to a multiple of the period of the AC current used by the apparatus and comparison of the integrated signals with a predetermined threshold.

* * * * *